United States Patent
Nakashima et al.

(10) Patent No.: US 7,816,812 B2
(45) Date of Patent: Oct. 19, 2010

(54) ELECTRONIC DEVICE, AND SYSTEM FOR DC VOLTAGE CONVERSION

(75) Inventors: Yoshiyasu Nakashima, Kawasaki (JP); Satoshi Kazama, Kawasaki (JP); Koichi Yokota, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 122 days.

(21) Appl. No.: 11/986,081

(22) Filed: Nov. 20, 2007

(65) Prior Publication Data

US 2008/0179955 A1  Jul. 31, 2008

(30) Foreign Application Priority Data

Jan. 30, 2007  (JP) .............................. 2007-019832

(51) Int. Cl.
  *H02J 1/10*  (2006.01)
  *H02J 3/38*  (2006.01)
  *H02J 7/34*  (2006.01)

(52) U.S. Cl. .............................. 307/44; 307/48; 307/64

(58) Field of Classification Search .................... 307/25, 307/44–45, 48, 64, 66
See application file for complete search history.

(56) References Cited

U.S. PATENT DOCUMENTS 6,628,011 B2 *  9/2003  Droppo et al. ................. 307/43

2005/0068002 A1 *  3/2005  Ozeki .......................... 320/101
2006/0029846 A1   2/2006  Konoto et al.
2007/0009770 A1   1/2007  Takada et al.
2008/0157918 A1 *  7/2008  Black et al. .................. 340/5.8

FOREIGN PATENT DOCUMENTS

CN  1893216  1/2007
JP  2006-073503  3/2006

* cited by examiner

*Primary Examiner*—Jared J Fureman
*Assistant Examiner*—Carlos Amaya
(74) *Attorney, Agent, or Firm*—Greer, Burns & Crain, Ltd.

(57) ABSTRACT

An electronic device includes: a first input terminal to which a first DC supply voltage of a fuel cell system having a controllable supply voltage is provided; a second input terminal to which a second DC supply voltage of a rechargeable secondary battery is provided; a DC voltage conversion circuit which receives the first and second DC supply voltages from the first and second input terminals, and supplies a current of a desired voltage to a load; a charging circuit which receives the first DC supply voltage from the first input terminal, and supplies a DC supply voltage for charging to the second input terminal; and a control circuit which determines a desired value of the first DC supply voltage in accordance with a value of the second DC supply voltage of the secondary battery, and provides the determined desired value to the fuel cell system.

11 Claims, 7 Drawing Sheets

TABLE OF α VALUES FOR LOAD

| CPU LOAD Ldr(%) | α (V) |
|---|---|
| < 10 | 0.2 |
| < 30 | 0.5 |
| < 50 | 1.0V |
| = 51~ | 2.0V |

FIG. 6A

TABLE OF α VALUES FOR LOAD

| SYSTEM LOAD Ldp(W) | α (V) |
|---|---|
| < 5 | 0.2 |
| < 8 | 0.5 |
| < 12 | 1.0V |
| = 12~ | 2.0V |

FIG. 6B

ELECTRONIC DEVICE, AND SYSTEM FOR DC VOLTAGE CONVERSION

FIELD OF THE INVENTION

The present invention generally relates to an electronic device for use with a fuel cell and, more particularly, to the control of the fuel cell by the electronic device in accordance with the voltage of a secondary battery of the electronic device and the power consumption of a load in the electronic device.

BACKGROUND OF THE INVENTION

A rechargeable secondary battery unit is used for a mobile notebook personal computer (PC). Although a fuel cell unit as a new electric energy source has been developed, a fuel cell which alone can supply sufficient current to a notebook PC has not been realized. At present, a fuel cell unit cannot provide sufficient current for a notebook PC when it is used alone. Accordingly, it has been proposed to use a secondary battery unit in combination with a fuel cell unit for a notebook PC.

Japanese Patent Application Publication JP 2006-73503-A laid open to the public on Nov. 11, 2004 discloses a fuel cell system. This fuel cell system includes a fuel cell stack, a fuel supply part to supply fuel to the fuel cell stack, a secondary battery as an accumulator device, a bidirectional DC/DC converter which selectively performs an operation of converting the output voltage of the secondary battery to a prescribed voltage to output it, and an operation of charging the secondary battery by using the output power of the fuel cell stack, and a mode control circuit. The mode control circuit detects the output voltage of the fuel cell stack to cause the bidirectional DC/DC converter to perform the charge operation, when the output voltage of the fuel cell stack is higher than a set value, and to cause the bidirectional DC/DC converter to perform the discharge operation, when the output voltage of the fuel cell stack is not higher than the set value. Thus, an accumulator device can be charged without putting an external load in a stopped state.

SUMMARY OF THE INVENTION

In accordance with an aspect of the present invention, an electronic device includes: a first input terminal to which a first DC supply voltage of a fuel cell system having a controllable supply voltage is provided; a second input terminal to which a second DC supply voltage of a rechargeable secondary battery is provided; a DC voltage conversion circuit receiving the first and second DC supply voltages from the first and second input terminals, and supplies a current of a desired voltage to a load; a charging circuit receiving the first DC supply voltage from the first input terminal, and supplies a DC supply voltage for charging to the second input terminal; and a control circuit determining a desired value of the first DC supply voltage in accordance with a value of the second DC supply voltage of the secondary battery, and provides the determined desired value to the fuel cell system.

The invention also relates to a DC voltage conversion system for use in the electronic device as described above.

DESCRIPTION OF THE PREFERRED EMBODIMENTS

It has been contemplated to use, as a power source of a mobile terminal device, a fuel cell in combination with a conventional AC adapter and a conventional secondary battery pack. Typically, it is assumed that, in a mobile terminal device, the fuel cell system is treated similarly to the AC adapter, and adapted to supply power through a DC-IN terminal. Thus, the fuel cell system has an output DC voltage which is equal to the supply voltage (e.g., 19 V) of the AC adapter. Thus, it is required to convert the DC supply voltage of the fuel cell to a higher DC output voltage. On the other hand, the output voltage supplied by the fuel cell system is converted to a lower voltage required for the load in such a mobile terminal device.

Generally, conversion of a DC voltage into a different DC voltage that may be higher or lower results in a larger conversion power loss. The DC output voltage of the fuel cell is converted to a higher DC voltage in the fuel cell system, and then an output voltage from the fuel cell system is converted to a lower voltage in the mobile terminal. Thus, the power conversion efficiency in the DC voltage conversion to higher and lower voltages is low.

The inventors have recognized that the conversion loss of the power supplied by the fuel cell system may be reduced by variably controlling the output DC voltage of the fuel cell system so as to be slightly higher than the output DC voltage of the secondary battery.

An object of the present invention is to allow an output voltage of a fuel cell system to be variably controlled.

Another object of the present invention is to efficiently convert a voltage of a fuel cell to a voltage for a load depending on an output DC voltage of a secondary battery.

According to the invention, an output voltage of a fuel cell system can be variably controlled, and a voltage of a fuel cell can be efficiently converted to a voltage for a load depending on an output DC voltage of a secondary battery.

The invention will be described in connection with non-limiting embodiments with reference to the accompanying drawings. Throughout the drawings, similar symbols and numerals indicate similar items and functions.

Figure 1:
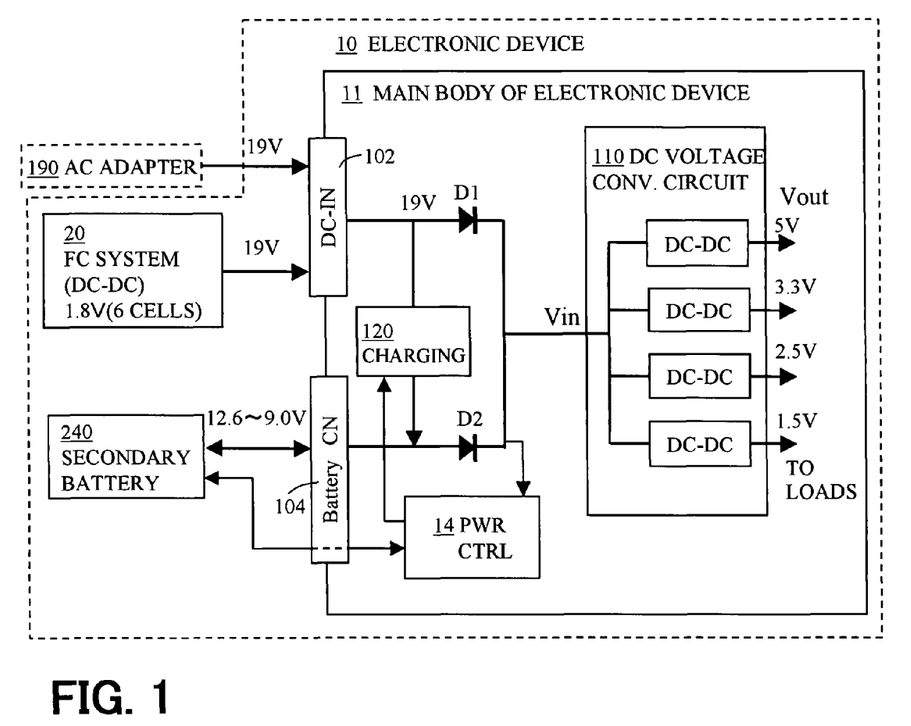
FIG. 1 shows a conventional electronic device 10 including a main unit, a conventional fuel cell (FC) system or device, and a rechargeable secondary battery.

FIG. 1 shows a conventional electronic device 10 including a main unit 11, a conventional fuel cell (FC) system or device 20, and a rechargeable secondary battery 240.

Referring to FIG. 1, in the electronic device 10, the output of the fuel cell system 20 is connected to a DC power input terminal (DC-IN) 102 of the main unit 11, the output of the secondary battery 240 is connected to a battery connector (Battery-CN) 104 of the main unit 11, and an AC adapter 190 is connectable to the DC power input terminal 102 of the main unit 11.

In the electronic device 10, the output powers of the fuel cell system 20 and the AC adapter 190 are supplied to a DC voltage conversion circuit 110 in the main unit 11 through the DC power input terminal 102 and a diode D1. The output power of the secondary battery 240 is supplied to the DC voltage conversion circuit 110 through the battery connector 104 and a diode D2. The DC power input terminal 102 is connected to the battery connector 104 through a charging circuit 120. A power controller 14 controls the charging circuit 120 in accordance with values of the output DC voltage of the secondary battery 240 and the voltage supplied to the DC voltage conversion circuit 110. In this case, the voltage of the fuel cell system 20 is boosted to the same voltage (e.g., 19 V) as the output voltage of the AC adapter 190. The DC voltage conversion circuit 110, which includes a plurality of DC-DC or DC voltage converters, converts the input DC voltage into desired DC voltages and supplies the desired DC voltages to respective loads of the components.

Figure 2:
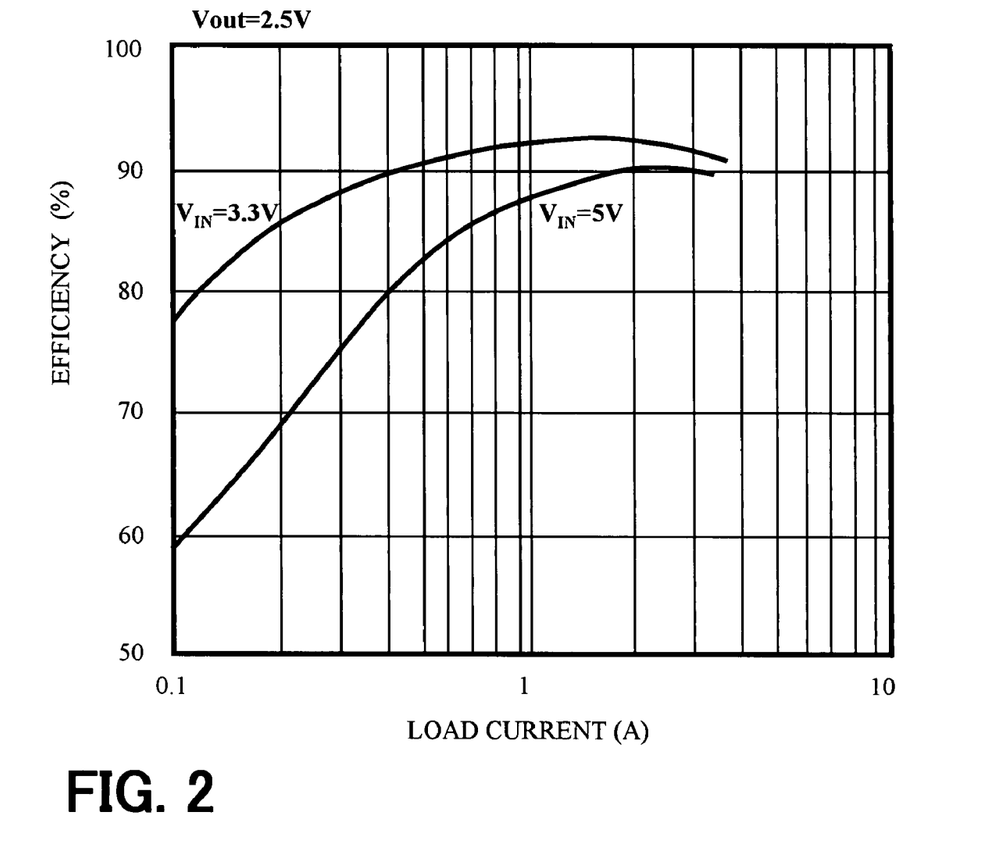
FIG. 2 shows an example of variations of power efficiency versus the load current in the voltage conversion, when one DC-DC converter in the DC voltage conversion circuit converts the DC supply voltage from either of two different input voltages into a desired low supply voltage.

FIG. 2 shows examples of variation of power efficiency versus the load current in the voltage conversion, when one DC-DC converter for an output voltage of 2.5 V in the DC voltage conversion circuit 110 converts the DC supply voltage from either of two different input voltages Vin (=3.3 V and 5 V) into a desired low supply voltage of 2.5 V. In the range of the load current between 0 A and 3.5 A, the power efficiency of the voltage conversion for the input voltage $V_{IN}$ of 5 V is lower than that for the input voltage $V_{IN}$ of 3.3 V. Generally, the larger the difference between the output voltage and the input voltage is, the lower the power efficiency of the voltage conversion is.

In the conventional fuel cell system 20, the DC output voltage of the fuel cell of approximately 1.8 V is converted to a higher DC voltage of 19 V which is equal to as the output DC voltage of the AC adapter, and then the output voltage of 19 V from the fuel cell system 20 is converted to a lower voltage between 1.5 and 5 V by the DC voltage conversion circuit 110 of the electronic device 10. Thus the power loss in the DC voltage conversion for stepping up and stepping down the voltages is large. On the other hand, the charging of the secondary battery 240 by the fuel cell system 20 requires the output voltage from the fuel cell system 20 to be higher than that of the secondary battery 240. The output power capability per unit time of the fuel cell system 20 is insufficient for driving a PC in operating in a high-load state, and hence the secondary battery 240 cannot be separated from the DC voltage conversion circuit 110 to compensate for the insufficient power capability.

The inventors have recognized that the conversion loss of the power supplied by the fuel cell system can be reduced by variably controlling the output DC voltage of the fuel cell system so as to be slightly higher than the output DC voltage of the secondary battery.

Figure 3:
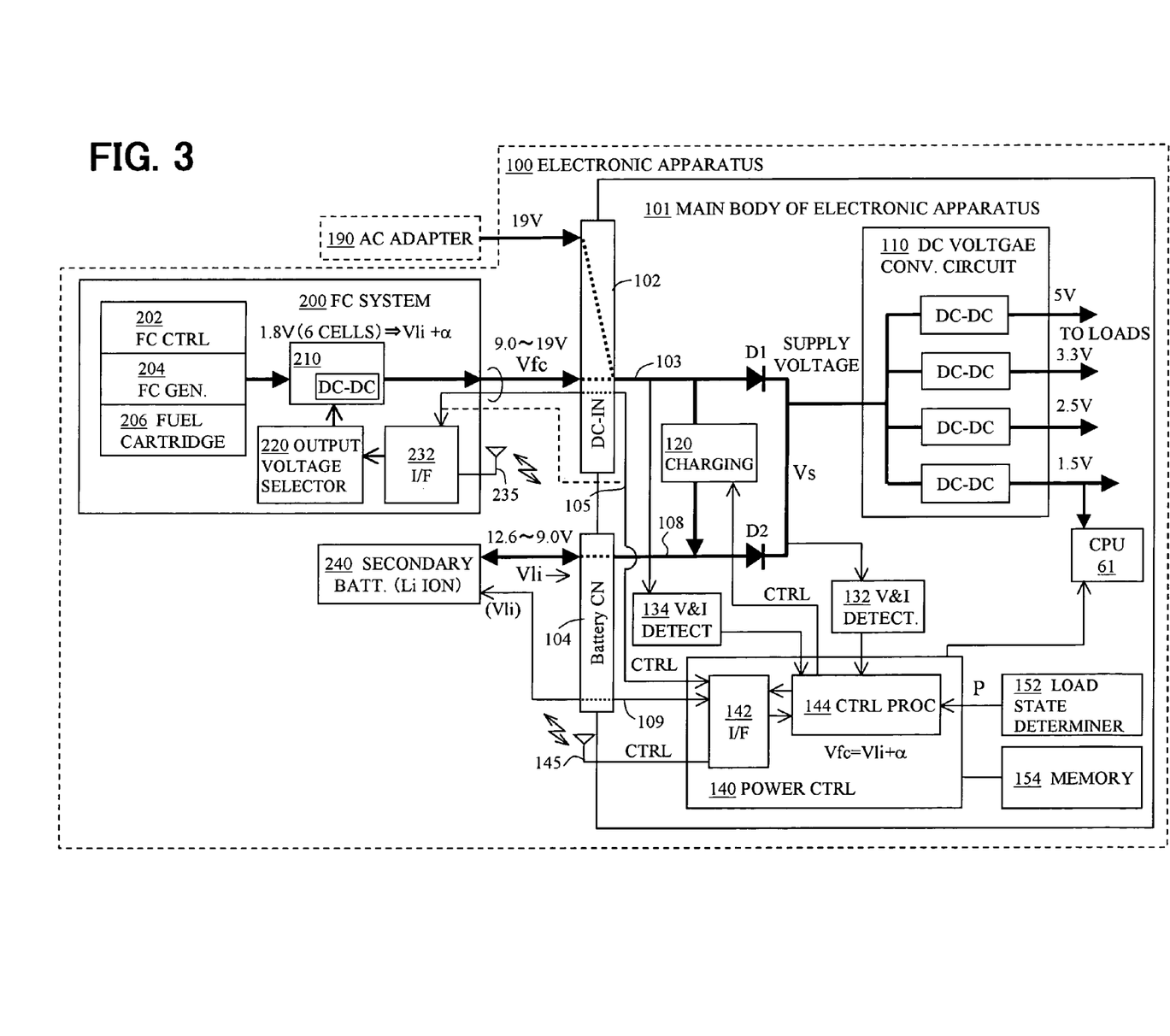
FIG. 3 shows an electronic device including a main unit, a fuel cell (FC) system and a rechargeable secondary battery, in accordance with an embodiment of the present invention.

FIG. 3 shows an electronic device 100 including a main unit 101, a fuel cell (FC) system 200 and a rechargeable secondary battery 240, in accordance with an embodiment of the present invention. The electronic device 100 may be, for example, a mobile telephone or a mobile personal computer. The electronic device main unit 101 is connectable to a DC voltage output terminal of the AC adapter 190.

Referring to FIG. 3, in the electronic device 100, the fuel cell system 200 is connected to the electronic device main unit 101 through the DC power input terminal (DC-IN) 102. The secondary battery 240 is connected to the electronic device main unit 101 through the battery connector (Battery-CN) 104. The AC adapter 190 is connectable to the electronic device main unit 101 through the DC power input terminal 102.

In FIG. 3, the fuel cell system 200 includes a fuel cell (FC) controller 202, a fuel cell power generator 204, a fuel cartridge 206, a DC voltage conversion circuit 210 having one controllable DC-DC converter, an output voltage selector or switch 220, and a communication interface (I/F) 232. The fuel cell power generator 204 generates power by causing the methanol supplied from the fuel cartridge 206 to chemically react under the control of the FC controller 202, and supplies the output DC voltage to the DC voltage conversion circuit 210.

The electronic device main unit 101 includes the DC power input terminal 102 to which the output terminals of the AC adapter 190 and/or the fuel cell system 200 are connected, the battery connector 104 to which the output terminal of the secondary battery 240 is connected, the DC voltage conversion circuit 110 which supplies powers of desired voltage to the loads of different components, the charging circuit 120 which charges the secondary battery 240 with the power from the fuel cell system 200, a power controller 140 which controls the power supply to the DC voltage conversion circuit 110, and a load state determiner 152 which determines a detected power consumption value or a state P of the load of the system of the electronic device main unit 101. A plurality of DC voltage outputs of the DC voltage conversion circuit 110 are coupled to the loads of the components of the electronic device system.

The electronic device main unit 101 further includes a feeding path 103 including the diode D1 having an anode coupled to the DC power input terminal 102 and a cathode coupled to the DC power input terminal of the DC voltage conversion circuit 110, a feeding path 108 including the diode D2 having an anode coupled to the battery connector 104 and a cathode coupled to the cathode of the diode D1 and the DC voltage input of the DC voltage conversion circuit 110, a voltage and current detector 132 which detects the values of the supply voltage Vs and the current Is at the DC power input of the DC voltage conversion circuit 110, and possibly a voltage and current detector 134 which detects the voltage Vfc of the DC output voltage and the current Ifc of the fuel cell system 200 at the DC power input terminal 102. Thus, the DC power input terminal 102 and the battery connector 104 are connected to the input of the DC voltage conversion circuit 110 through the diodes D1 and D2.

The power controller 140 includes a control processor 144, and a communication interface (I/F) 142. The communication interface 142 is connected to the communication interface 232 of the fuel cell system 200 through a communication line 105 and connected to a communication interface (not shown) of the secondary battery 240 through a communication line 109 passing through the battery connector 104. The functions of control processor 144 may be implemented in the form of hardware such as an integrated circuit, or in the form of software as a program stored in a memory 154.

The communication path or line 105 between the communication interface 142 and the communication interface 232 may be formed on the feeding path 103 by superimposing a modulated signal at a predetermined frequency carrying a control signal CTRL and the like, on the feeding path 103 according to the power line carrier method. The communication path 105 may be formed by a separate communication line without passing through the battery connector 104 as shown by a dashed line. Alternatively, the communication path between the communication interface 142 and the communication interface 232 may be formed by a wireless communication of feeble power through antennas 145 and 235 according to a contactless communication method based on the RF ID technology or the short-range wireless communication technology such as the Bluetooth standard.

The voltage and current detector 132 detects the supply voltage Vs supplied to the DC voltage conversion circuit 110 at the junction of the cathodes of the diodes D1 and D2. The load state determiner 152 measures the total load power of the system of the electronic device main unit 101 or detects the operating states of the loads.

The control processor 144 generates and supplies the control signal CTRL to the fuel cell system 200 and the charging circuit 120. The control signal CTRL is generated by the control processor 144 in accordance with at least an output DC voltage value Vli from the secondary battery 240, preferably, further with a measured value of the load power consumption or a state P of the load determined by the load state determiner 152, and further, possibly with the supply voltage Vs detected by the voltage and current detector 132 and/or the present supply voltage Vfc of the fuel cell system 200 detected by the voltage and current detector 134.

The output voltage selector 220 of the fuel cell system 200 changes or selects the value of the DC output voltage of the DC voltage conversion circuit 210 in accordance with the control signal CTRL received from the power controller 140 through the communication line 105. In accordance with the control signal CTRL from the power controller 140, the charging circuit 120 operates to start supplying the output voltage Vfc from the fuel cell system 200 to the secondary battery 240 and to stop supplying the output voltage Vfc.

Further, in accordance with the supply voltage Vs detected by the voltage and current detector 132, the control processor 144 instructs a CPU 61 or the system of the electronic device main unit 101 to execute a forced system shutdown process, when the supply voltage Vs supplied to the DC power input of the electronic device main unit 101 by the AC adapter 190, the fuel cell system 200 and/or the secondary battery 240 becomes lower than a predetermined voltage (e.g., about 5.5 V, or a voltage at which the DC-DC converter of the DC voltage conversion circuit 110 cannot maintain an output voltage of 5 V). This prevents the system of the electronic device main unit 101 from operating abnormally due to the low supply voltage when the supply voltage to the electronic device main unit 101 becomes a low voltage at which required minimum or higher supply voltages cannot be maintained.

Figure 4:
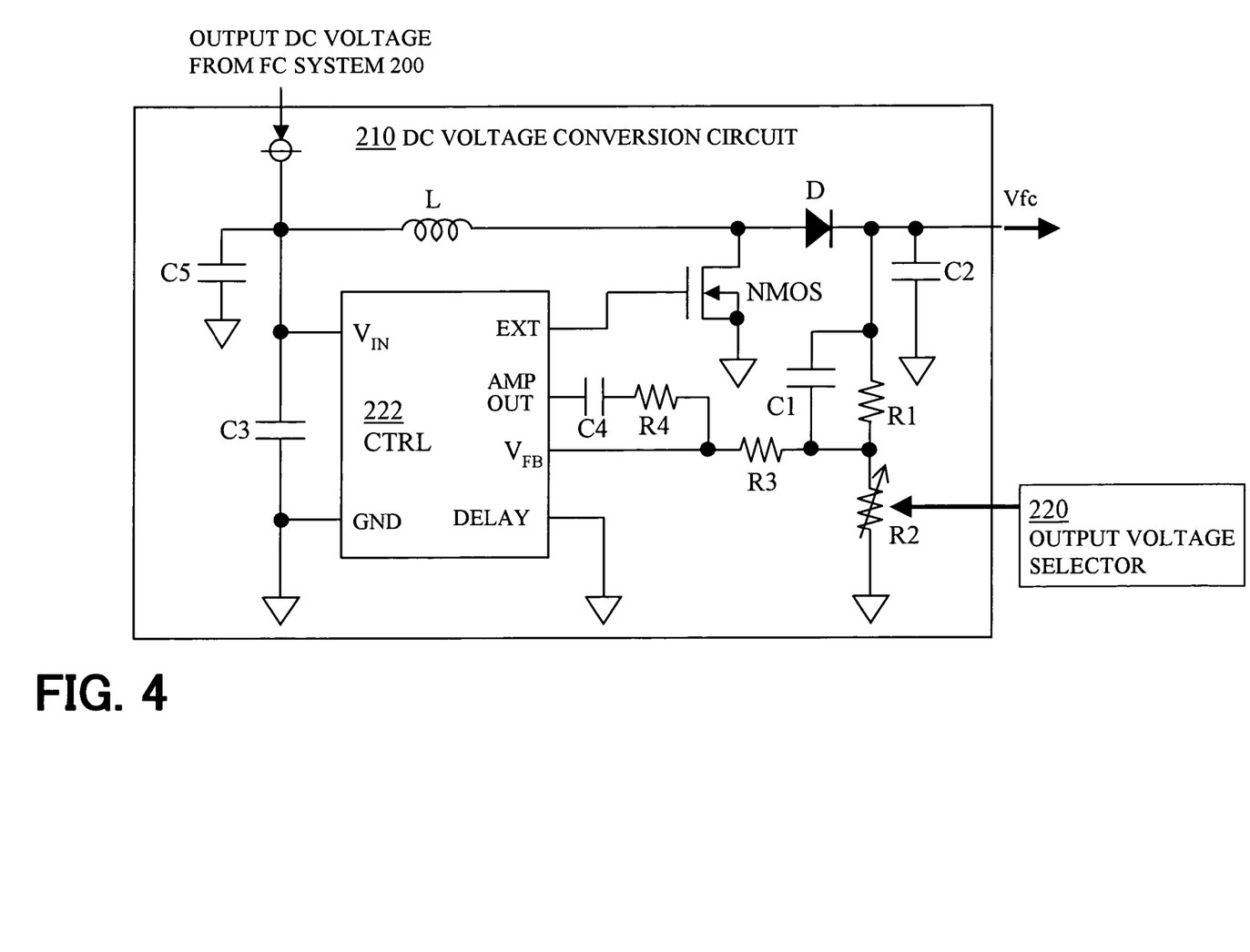
FIG. 4 shows an example of the arrangement of the DC voltage conversion circuit.

FIG. 4 shows an example of the arrangement of the DC voltage conversion circuit 210. The DC voltage conversion circuit 210 includes an inductor L, a switching transistor NMOS, a diode D, resistors R1 to R4, capacitors C1 to C4 and a controller 222. The resistor R2 is a variable resistor controlled by the output voltage selector 220.

Figure 5A:
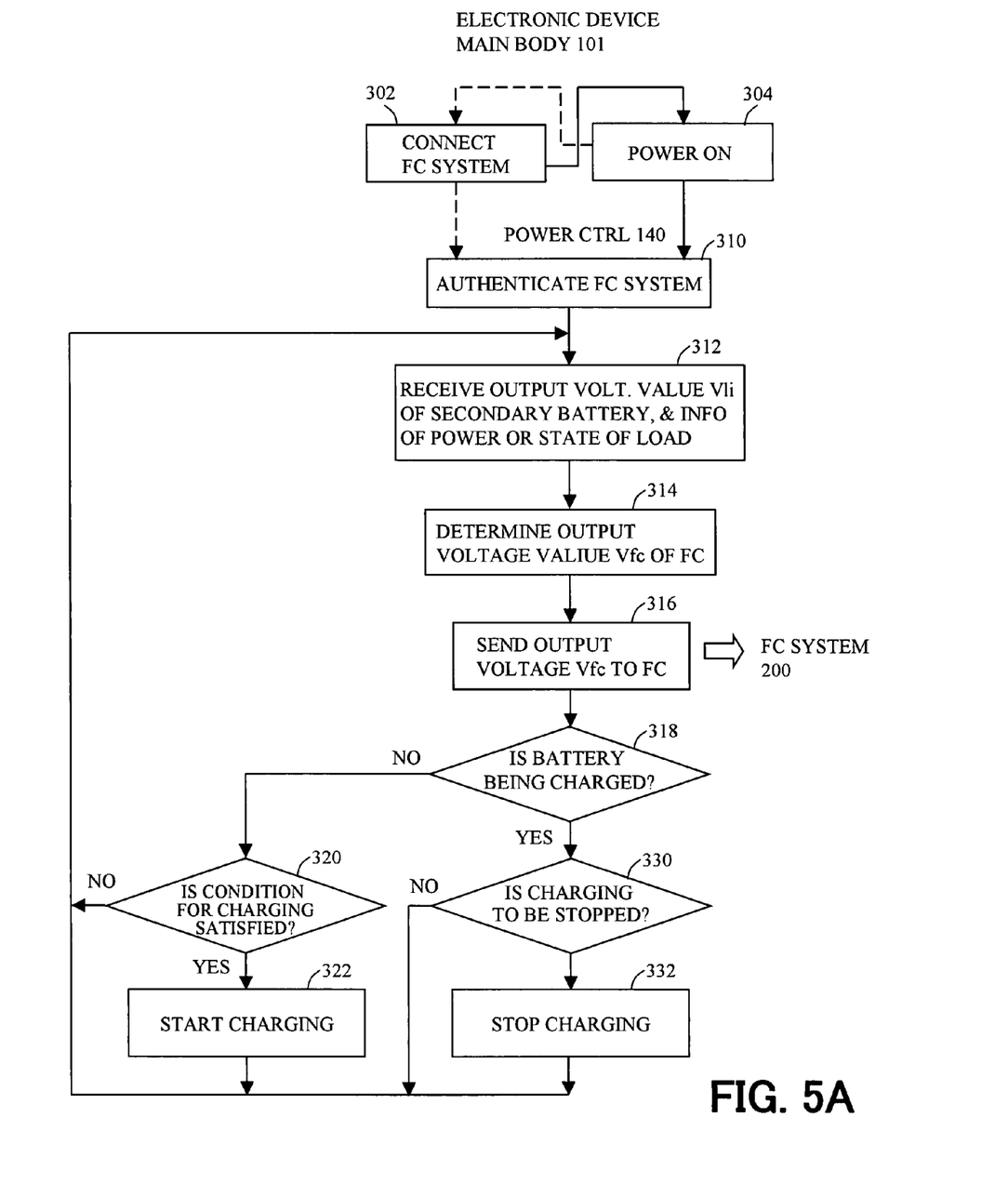
FIGS. 5A and 5B show flow charts for controlling the fuel cell system, executed by the power controller and the fuel cell system of the electronic device.
Figure 5B:
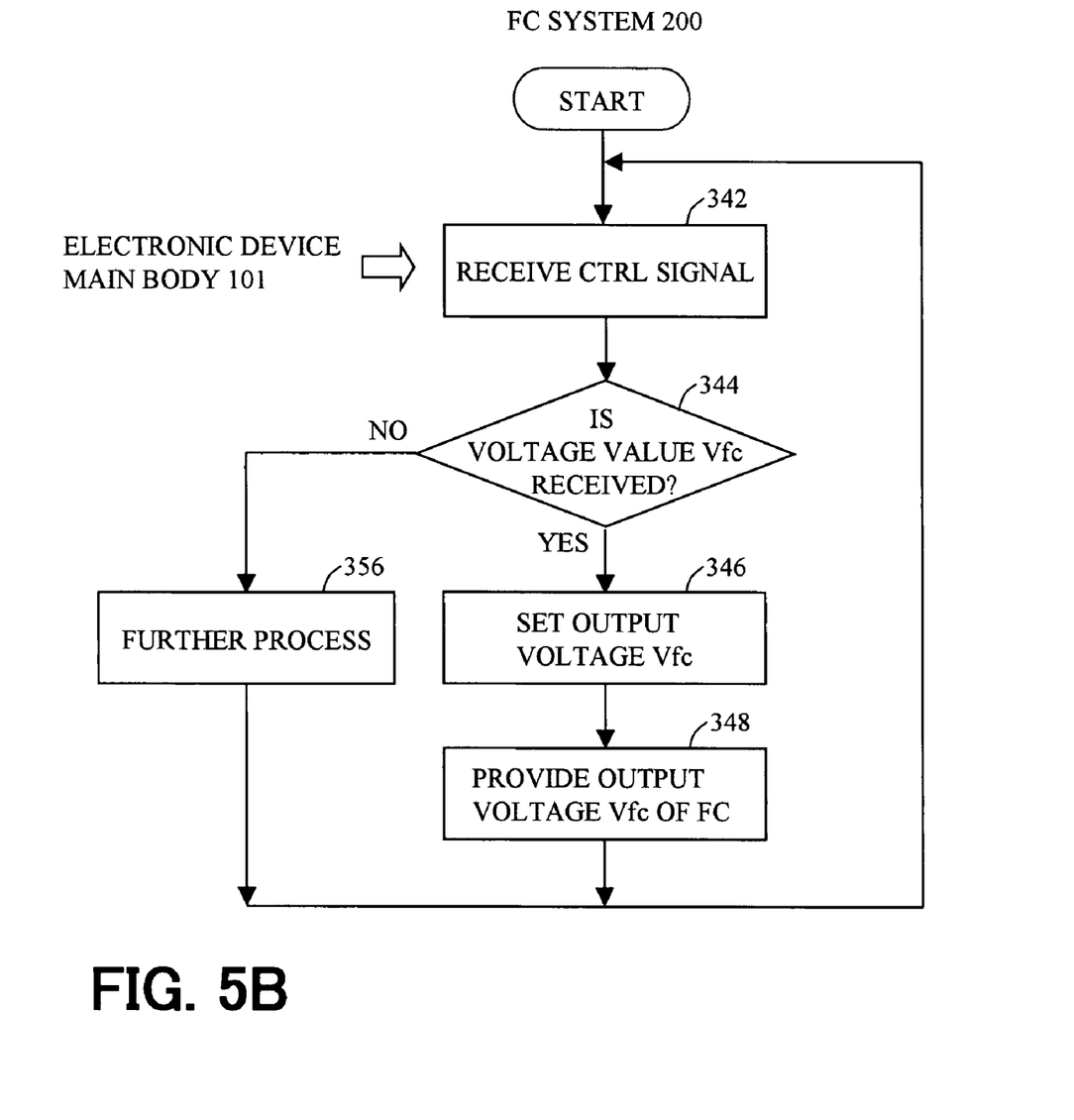

FIGS. 5A and 5B show flow charts for controlling the fuel cell system 200, executed by the power controller 140 and the fuel cell system 200 of the electronic device 100.

Referring to FIG. 5A, the user first at Step 302 connects the fuel cell system 200 to the electronic device main unit 101, and then at Step 304 powers on the electronic device main unit 101 as indicated by the solid line with an arrow. Alternatively, the user may first at Step 304 powers on the electronic device main unit 101 before he or she at Step 302 connects the fuel cell system 200 to the electronic device main unit 101 as indicated by the dashed line with an arrow. After that, the procedure proceeds to Step 310.

At Step 310, the power controller 140 communicates with the fuel cell system 200 through the communication line 105, and authenticates the fuel cell system 200.

At Step 312, the power controller 140 (the control processor 144) receives the output DC voltage value Vli of the secondary battery 240 through the communication line 109 from the secondary battery 240, and receives information indicative of the measured power consumption value or the state P of the load of the electronic device system from the load state determiner 152.

At Step 314, the power controller 140 determines the output DC voltage value Vfc=Vli+α(P) of the fuel cell system 200 in accordance with the voltage value Vli of the secondary battery 240 and the power value or the state P of the load of the electronic device system, where α(P) represents an added voltage value as a function of P. The added voltage value α(P) may be determined in accordance with the operating state of the charging circuit 120. At Step 316, the power controller 140 supplies the determined value of the output DC voltage Vfc in the control signal CTRL through the communication line 109 to the fuel cell system 200.

Referring to FIG. 5B, at Step 342, the communication interface 232 of the fuel cell system 200 receives the control signal CTRL from the power controller 140. At Step 344, the communication interface 232 determines whether or not the communication interface 232 has received a required value of the output DC voltage Vfc in the control signal CTRL from the power controller 140. If it is determined that the communication interface 232 has not received it, the communication interface 232 at Step 356 performs a further desired process. As such a further desired process, for example, when the authentication information of the fuel cell system 200 required for the authentication processing is requested in the control signal CTRL, the communication interface 232 may send the authentication information to the power controller 140.

If it is determined at Step 344 that the communication interface 232 has received the required value of the output DC voltage Vfc, the output voltage selector 220 at Step 346 sets the received required value of the output DC voltage Vfc to the DC voltage conversion circuit 210.

At Step 348, the DC voltage conversion circuit 210 of the fuel cell system 200 operates to supply the output DC voltage Vfc of the set required value as the output. After that, the procedure returns to Step 342, where the communication interface 232 waits for the reception of the next control signal.

Referring back to FIG. 5A, at Step 318, the power controller 140 determines whether or not the charging circuit 120 is charging the secondary battery 240, i.e., whether or not it is supplying current to the secondary battery 240. For the determination, the power controller 140 may use any of the control signal CTRL provided to the charging circuit 120, the voltage and current values of the voltage and current detectors 132 and 134, and the voltage value Vli of the secondary battery 240. If it is determined that the charging circuit 120 is not charging the secondary battery, the power controller 140 at Step 320 determines whether or not the condition for starting the charging of the secondary battery 240 is satisfied. If it is determined that the condition is not satisfied, the procedure returns to Step 312. If it is determined that the condition is satisfied, the power controller 140 at Step 322 sends, to the charging circuit 120, the control signal CTRL for controlling the charging circuit 120 to start charging the secondary battery 240. After that, the procedure returns to Step 312.

If it is determined at Step 318 that the charging circuit 120 is charging, the power controller 140 at Step 330 determines whether or not the condition for stopping the charging is satisfied, i.e., whether or not the charging is to be stopped. The condition for stopping the charging may be, for example, that the value of the output DC voltage Vfc on the feeding path 103 detected by the voltage and current detector 105 is significantly lower (e.g. 0.5 V) than the output voltage Vli of the secondary battery 240 over a long period of time (e.g. two seconds) and that the power from the fuel cell system 200 is significantly lower (e.g. 5 W) than the power consumption P of the load. If it is determined that the charging is not to be stopped, the procedure returns to Step 312. If it is determined that the charging is to be stopped, the power controller 140 at Step 332 sends to the charging circuit 120 the control signal CTRL for controlling the charging circuit 120 to stop the charging of the secondary battery 240. After that, the procedure returns to Step 312.

In a first method of determining the output DC voltage value Vfc at Step 314, the output DC voltage value Vfc may be determined to be a value equal to the voltage value Vli of the secondary battery 240 (Vfc=Vli, α=0). The voltage values Vfc and Vli slightly vary with time depending on the load current. When the voltage value Vfc is equal to the voltage value Vli (i.e., Vfc=Vli), power is supplied by the fuel cell system 200 and the secondary battery 240 to the DC voltage conversion circuit 110. When the voltage value Vfc is temporarily higher than the voltage value Vli (i.e., Vfc>Vli), power is preferentially supplied by the fuel cell system 200 to the DC voltage conversion circuit 110, and further, if possible, the secondary battery 240 is charged. On the other hand, when the voltage value Vli is temporarily higher than the voltage value Vfc (i.e., Vfc>Vli), power is preferentially supplied by the secondary battery 240 to the DC voltage conversion circuit 110.

In a second method of determining the output DC voltage value Vfc at Step 314, the output DC voltage value Vfc may be determined to be the sum of the voltage value Vli of the secondary battery 240 and a predetermined value α (e.g., α=1.5 V) (Vfc=Vli+α [constant]). The predetermined value α may be a fixed value prestored in the memory 154 for the power controller 140 or may be a fixed value predetermined by the user or the software for implementing the system on the CPU 61.

In a third method of determining the output DC voltage value Vfc at Step 314, the output DC voltage value Vfc may be determined to be the sum of the voltage value Vli of the secondary battery 240 and the value α(P) associated with the measured power value or the state P of the load (Vfc=Vli+α(P)).

Now, a method of determining the value of the output DC voltage value Vfc in accordance with the measured power value or the state P of the load is described. The control processor 144 of the power controller 140 may determine a value α(V) corresponding to the power of the load or the state P of the load by looking up a table stored in the memory 154, in accordance with the measured power value or the state P of the load.

Figure 6A:
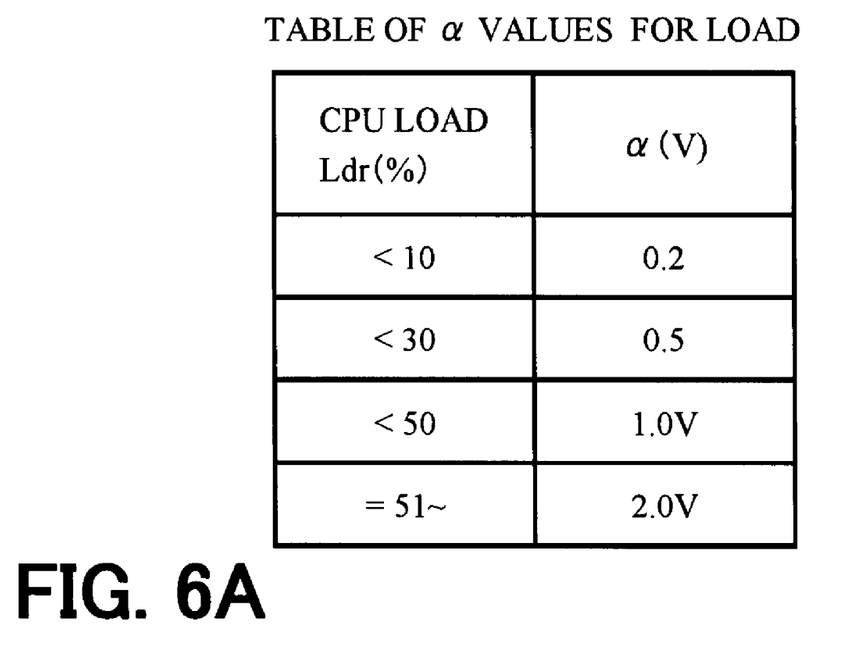
FIGS. 6A and 6B illustrate respective tables showing respective relations of the load representative of the CPU occupancy as the state of the load with the added voltage, and of the load representative of the system load power consumption with the added voltage.
Figure 6B:
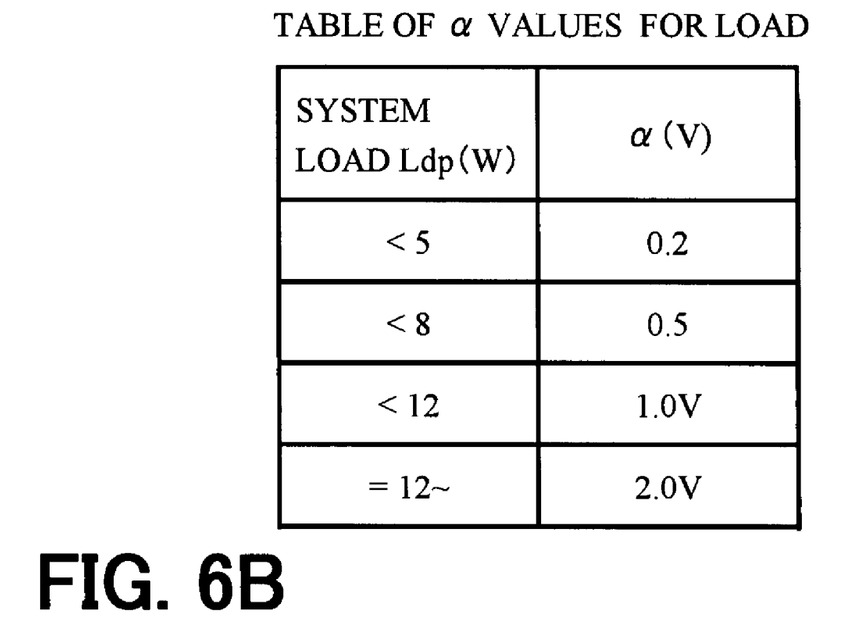

FIGS. 6A and 6B illustrate respective tables showing respective relations of the load Ldr (%) representative of the CPU occupancy as the state P of the load with the added voltage α (V), and of the load Ldp (W) representative of the system load power consumption P with the added voltage α (V). These tables may be stored in the memory 154 of the power controller 140.

In FIG. 6A, for the detected CPU occupancy or load Ldr which is less than 10% (i.e, Ldr<10%), the added voltage α is determined to be 0.2 V. For the CPU load which is not less than 10% and less than 30% (i.e, 10%≦Ldr<30%), the added voltage α is determined to be 0.5 V. For the CPU load which is not less than 30% and less than 50% (i.e, 30%≦Ldr<50%), the added voltage a is determined to be 1.0 V. For the CPU load which is not less than 51% (i.e., Ldr≧50%), the added voltage α is determined to be 2.0 V.

In FIG. 6B, for the detected power consumption Ldp of the load of the system which is less than 5 W, the added voltage α is determined to be 0.2 V. For the power consumption of the load of the system which is not less than 5 W and less than 8 W, the added voltage a is determined to be 0.5 V. For the power consumption of the load of the system which is not less than 8 W and less than 12 W, the added voltage α is determined to be 1.0 V. For the power consumption of the load of the system which is not less than 12 W, the added voltage α is determined to be 2.0 V.

The control processor 144 can determine the remaining power of the secondary battery 240 in accordance with the value of the output DC voltage Vli and with a characteristic curve stored in a memory (not shown) of the secondary battery 240, according to a known method. The output DC voltage Vli decreases as the remaining power decreases.

When the secondary battery 240 is not full and can be charged, and the load power Ldp is low and the condition Vfc>Vli can be satisfied and maintained, the control processor 144 determines the output DC voltage value Vfc to be a higher voltage value Vli+α' (for α'>α) for charging the secondary battery 240. Under the control of the control processor 144, the charging circuit 120 applies the output DC voltage Vfc on the feeding path 103 of the fuel cell system 200 to the secondary battery 240, to thereby charge the secondary battery 240.

The DC output power of the fuel cell system 200 is preferentially supplied to the DC voltage conversion circuit 110 of the electronic device main unit 101. The higher the set value of the predetermined value α or α' is, the larger the number of opportunities or the longer the time to charge the secondary battery 240 is. However, when the load Ldp of the system of the electronic device main unit 101 increases and the output DC voltage Vfc of the fuel cell system 200 is insufficient for charging the secondary battery 240, the control processor 144 prevents or stops the charging circuit 120 from performing the charging, and further, causes the secondary battery 240 to supply a power undersupply for compensating insufficiency. Thus, as the state of the high load power Ldp continues, the accumulated charge of the secondary battery 240 gradually decreases and the voltage of the secondary battery 240 gradually decreases.

Alternatively, when the secondary battery 240 is not full and can be charged, and the load power Ldp is low and a condition Vfc=Vli$_{MAX}$ can be satisfied and maintained, the output DC voltage Vfc may be determined to be a predetermined voltage (e.g., 15 V) not less than the maximum voltage Vli$_{MAX}$ (e.g., 12.6 V) of the secondary battery 240 for charging the secondary battery 240 (Vfc=Vli$_{MAX}$+α, where α is constant between 0 and 0.9 inclusive). Thereby, the secondary battery 240 is charged at a higher speed.

Even when the secondary battery 240 is not full and can be charged at Step 320 in such a state that the secondary battery 240 is neither operating nor charged, it is preferable for the control processor 144 to prevent the charging circuit 120 from starting the charging if the remaining power (A·hr) of the secondary battery 240 is higher than a predetermined percentage (e.g., 80%) of the full remaining power corresponding to the maximum voltage Vli$_{MAX}$. In this case, the control processor 144 allows the charging circuit 120 to start the charging when the remaining power is decreased to not more than the predetermined percentage (e.g., 80%) of the full remaining power. This reduces the deterioration of the discharge-recharge capacity of the secondary battery 240 due to excessive repetition of charging and discharging.

The above-described embodiments are only typical examples, and their combination, modifications and variations are apparent to those skilled in the art. It should be noted that those skilled in the art can make various modifications to the above-described embodiments without departing from the principle of the invention and the accompanying claims.

What is claimed is:

1. An electronic device comprising:
a first input terminal to which a first DC supply voltage of a fuel cell system having a controllable supply voltage is provided;
a second input terminal to which a second DC supply voltage of a rechargeable battery is provided;
a DC voltage conversion circuit for receiving the first and second DC supply voltages from the first and second input terminals, and supplying a current of a desired DC voltage to a load, wherein a power efficiency of voltage conversion of the DC voltage conversion circuit becomes higher as a difference between the received DC supply voltage and the desired DC voltage becomes lower;
a charging circuit for receiving the first DC supply voltage from the first input terminal, and supplying a DC supply voltage for charging to the second input terminal; and
a control circuit for receiving, from the rechargeable battery, a value of the second DC supply voltage of the rechargeable battery, and determining a desired value of the first DC supply voltage to be a sum of the received value of the second DC supply voltage of the rechargeable battery and a given value, and providing the determined desired value to the fuel cell system.

2. The electronic device according to claim 1, further comprising a load state determination unit for determining a state of the load,
wherein the control circuit determines the desired value of the first DC supply voltage in accordance with the received value of the second DC supply voltage of the rechargeable battery and the state of the load determined by the load state determination unit.

3. The electronic device according to claim 1, further comprising a load state determination unit for determining a state of the load,
wherein the control circuit looks up a table which defines a relation between the state of the load and the given value, and the control circuit determines the given value so that the given value corresponds to the state of the load in the table based on the state of the load determined by the load state determination unit.

4. The electronic device according to claim 3, wherein the state of the load is a CPU occupancy.

5. The electronic device according to claim 3, wherein the state of the load is a load power in the electronic device.

6. The electronic device according to claim 1,
wherein when the rechargeable battery is not full and can be charged by the first DC supply voltage of the fuel cell system, the control circuit determines the desired value of the first DC supply voltage to be a value higher than a voltage required for charging the rechargeable battery.

7. The electronic device according to claim 1,
wherein when the rechargeable battery is not full and can be charged by the first DC supply voltage of the fuel cell system, the control circuit determines the desired value of the first DC supply voltage to be a value not less than a maximum DC supply voltage of the rechargeable battery.

8. The electronic device according to claim 1,
wherein the control circuit allows the charging circuit to start charging the rechargeable battery when a remaining power of the rechargeable battery is lower than a given percentage of full remaining power of the rechargeable battery.

9. The electronic device according to claim 1, wherein a communication between the fuel cell system and the control circuit is performed through the first input terminal in a superimposed manner.

10. The electronic device according to claim 1, wherein a communication between the fuel cell system and the control circuit is performed by wireless communication.

11. A DC voltage conversion system comprising:
a first input terminal to which a first DC supply voltage of a fuel cell system having a controllable supply voltage is provided;
a second input terminal to which a second DC supply voltage of a rechargeable battery is provided;
a DC voltage conversion circuit for receiving the first and second DC supply voltages from the first and second input terminals, and supplies a current of a desired DC voltage to a load, wherein a power efficiency of voltage conversion of the DC voltage conversion circuit becomes higher as a difference between the received DC supply voltage and the desired DC voltage becomes lower;
a charging circuit for receiving the first DC supply voltage from the first input terminal, and supplies a DC supply voltage for charging to the second input terminal; and
a control circuit for receiving, from the rechargeable battery, a value of the second DC supply voltage of the rechargeable battery, and determining a desired value of the first DC supply voltage to be a sum of the received value of the second DC supply voltage of the rechargeable battery and a given value, and providing the determined desired value to the fuel cell system.

* * * * *